(12) United States Patent
Zinn

(10) Patent No.: US 7,398,101 B2
(45) Date of Patent: Jul. 8, 2008

(54) TRANSMITTER POWER LEVEL OPTIMIZATION AND ERROR CORRECTION TECHNIQUE

(75) Inventor: Raymond Zinn, Atherton, CA (US)

(73) Assignee: Micrel, Inc., San Jose, CA (US)

( * ) Notice: Subject to any disclaimer, the term of this patent is extended or adjusted under 35 U.S.C. 154(b) by 616 days.

(21) Appl. No.: 11/070,017

(22) Filed: Mar. 1, 2005

(65) Prior Publication Data

US 2006/0199602 A1    Sep. 7, 2006

(51) Int. Cl.
*H04B 7/00* (2006.01)
*H04Q 7/20* (2006.01)

(52) U.S. Cl. .................. 455/522; 455/91; 455/127.1; 455/39; 455/68; 455/69; 455/500; 455/507; 455/517

(58) Field of Classification Search .............. 455/91, 455/127.1, 39, 68, 69, 500, 507, 517, 522
See application file for complete search history.

(56) References Cited

U.S. PATENT DOCUMENTS

| 4,760,347 | A | 7/1988 | Li et al. |
| 5,129,098 | A | 7/1992 | McGirr et al. |
| 5,446,756 | A | 8/1995 | Mallinckrodt |
| 6,148,220 | A | 11/2000 | Sharp et al. |

*Primary Examiner*—Pankaj Kumar
*Assistant Examiner*—David S Luo
(74) *Attorney, Agent, or Firm*—Patent Law Group LLP; Brian D. Ogonowsky

(57) ABSTRACT

A master transceiver automatically lowers its transmit power level at intervals until a slave transceiver no longer accurately receives the transmitted data. When the master detects an inaccurate transfer of data, the master incrementally increases the transmit power level until it is determined that there has been an accurate transfer of data. At that time, the master transmits an acknowledge signal to the slave. Since the automatic power adjust routine is performed using the transmitted data from the master and the error control information transmitted by the slave, there is little or no overhead used by the power adjust routine. Simple control circuitry can be used to carry out the functions.

26 Claims, 5 Drawing Sheets

TRANSMITTER POWER LEVEL OPTIMIZATION AND ERROR CORRECTION TECHNIQUE

FIELD OF THE INVENTION

This invention relates to digital radio transceivers and, in particular, to a technique for adjusting the transmit power in such transceivers to an optimal level to conserve battery life.

BACKGROUND

An example will be given of one type of transceiver pair to illustrate a conventional technique for adjusting transmit power.

In battery operated RF transceivers, the bulk of the battery power is used for transmitting. The separation between a pair of transceivers communicating with each other may change if the transceivers are in mobile or transportable devices. Further, different operating environments have different noise levels and attenuate signal power differently. In most situations, the maximum transmit power level is more than is needed for reliable digital communications. Hence, for those situations in which maximum transmit power is not needed, battery power is wasted.

One known way to optimize transmit power for a pair of communicating transceivers is as follows. The receiver generates a receive strength signal indication (RSSI) signal based on the power of the received signal. The RSSI level is transmitted back to the original transmitter. The original transmitter uses a look-up table to identify a certain transmit power level associated with the RSSI signal which was predetermined to be the optimal transmit power given that RSSI level. For example, if the RSSI signal is very high, the look-up table will identify a lower transmit power for the transmitter since the transmitter can transmit at a lower power while still ensuring reliable communication. Such a routine is performed on a periodic basis to adjust the transmit power, and such overhead uses up bandwidth.

Such a routine typically requires a microprocessor to process the data, where the microprocessor adds considerable cost to the transceiver chip.

Error correction is another function performed by many transceivers. Such error correction is treated separately from optimizing the transmit power. Error correction typically requires complex circuitry and processing. Further, error correction is part of overhead which uses up bandwidth.

SUMMARY

A transceiver pair is described wherein payload data transmission, error correction, and transmit power adjustment are performed by the same operation. Accordingly, there is little or no additional overhead for transmitter power adjustment.

In one embodiment, a frequency shift keying (FSK) transceiver, temporarily acting as a master, transmits a packet of any type of data to another transceiver, temporarily acting as a slave. The slave receives the packet and transmits back an exact echo of the data. Alternately, the slave may transmit back any conventional error code for the received data. If the received echo or error code is proper for the transmitted data, the data transfer was accurate. For the examples herein, it is assumed the error correction is the simple echoing back of the data. The master compares the echo to the packet previously transmitted by the master. If there is a match, then the transfer of data was successful, and the master transmits an acknowledge bit to the slave. The slave then further processes the data since the data is correct. This function provides error correction and may be performed for every packet.

When a power adjust sequence is initiated, which may occur at any interval or for every packet, the following routine is performed.

EXAMPLE 1

The master reduces the transmit power level by one level. In one embodiment, there are seven power levels. If the data transfer is successful (based on the slave's echo), the master sends an acknowledge bit to the slave. The master incrementally reduces the power level by one for each subsequent transmission (e.g., for each packet) until the slave's echo does not match the transmitted packet. Once it is determined the transmit power is too low, the master increases the power to the next highest level (the previous successful power level), and the power adjust sequence is terminated. Instead of lowering the power by one level, any lowering may be used (e.g., by 2 or more or other algorithm). The power adjust technique may be constantly performed, with the master lowering then raising the power level to achieve an optimal power level. At any suitable time, the slave then becomes the master and vice versa, and the process is repeated.

EXAMPLE 2

In another example, the master reduces the transmit power level to the minimum level (i.e., level 1). In one embodiment, there are seven power levels. If the data transfer is successful, the master sends an acknowledge bit to the slave and keeps the power level at the minimum level. If the data transfer is not successful, the master increases the power level by one, or by any other amount, and resends the packet. The master incrementally increases the power level by one or more levels for each subsequent transmission (e.g., for each repeated packet) until the slave's echo matches the transmitted packet. Once it is determined the transmit power is optimal, the power level is maintained, and the power adjust sequence is terminated. The power adjust technique may be performed at any interval. At any suitable time, the slave then becomes the master and vice versa, and the process is repeated.

Since the power adjust sequence involves sending payload data (not overhead) and performing error correction, there is no overhead incurred by the power adjust sequence until a packet is lost by the power being too low. Such overhead is trivial compared to the prior art technique of transmitting RSSI levels and looking up a power level.

In another embodiment, if an RSSI signal is available and there has not been an accurate transfer of data, the system additionally detects whether the RSSI signal is above a certain level. If the RSSI level is above a certain level, the system initially assumes the faulty transmission is due to intermittent noise and repeats the transmission at the previous power level or changes frequency channels.

Any number of transceivers may act in concert to perform the above processes when communicating, with each communicating set of transceivers having a master (transmitter) and a slave (receiver).

DETAILED DESCRIPTION

Figure 1:
FIG. 1 is a diagram of two transceivers, one acting as a master and the other acting as a slave during a power adjust sequence.

FIG. 1 illustrates a pair of transceivers. One of the transceivers is designated the mater 10, and the other transceiver is designated the slave 12. Their designations will eventually reverse, depending on which transceiver is having its transmit power adjusted Since conserving power is most important in battery operated devices, it is assumed that the transceivers are battery operated and mobile. As the separation of the transceivers increases or decreases, or their environment changes, their optimal transmit power changes. The optimal transmit power is the minimum power needed to accurately transfer data.

Figure 2:
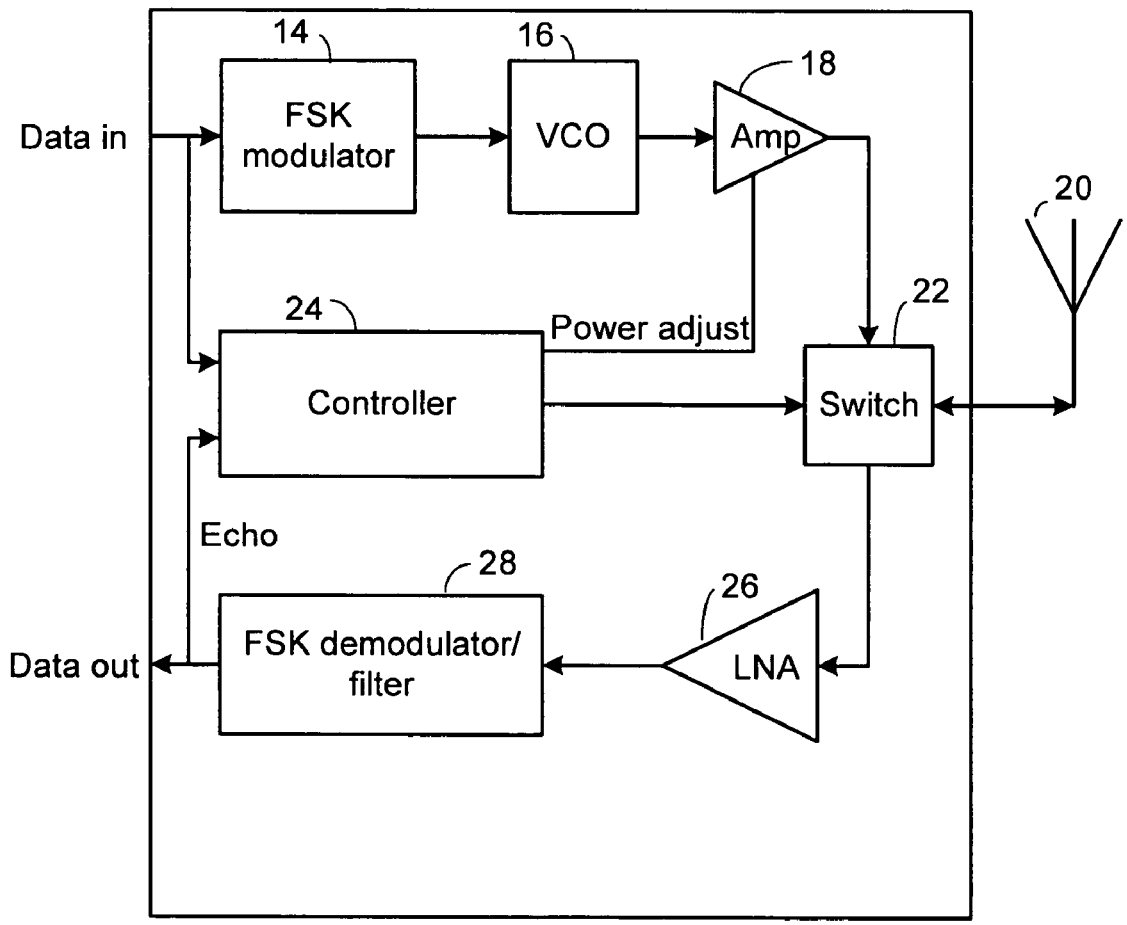
FIG. 2 is a block diagram of certain functional circuit units in the transceivers of FIG. 1.

FIG. 2 is a functional block diagram of the transceivers of FIG. 1. In this example, the transceivers are FSK types. An FSK transceiver transmits a first frequency for a 0 bit and a different frequency for a 1 bit. Such a technique is more immune to noise than AM. All hardware in the transmitter and receiver may be conventional except for the circuitry or software that carries out the routines described herein. Accordingly, the circuitry need not be described in detail to enable one skilled in the art to carry out the invention.

For transmission, binary data, typically in the form of a packet, is applied to an input of an FSK modulator 14. Modulator 14 then modulates the frequency of a voltage controlled oscillator (VCO) 16 depending on the bit states. The VCO 16 output is then amplified by an amplifier 18 and transmitted at radio frequencies via an antenna 20. Conventional mixers, filters, and other standard components of RF transceivers are not specifically shown for simplicity and are understood to be a part of the major components shown in FIG. 2.

For reception, a switch 22 is controlled by a controller 24 to connect the antenna 20 to a low noise amplifier (LNA) 26 for reception. The controller 24 controls the various operations of the transceiver. The controller 24 may comprises a combination of circuits. The received FSK signal is then effectively demodulated by an FSK demodulator 28 to determine if the frequency is above or below a threshold, to determine a 1 or 0 bit. The binary data is then output from the transceiver.

The controller 24 performs error correction by any number of ways. The simplest way is to temporarily store the previously transmitted packet in memory and compare the data with the echoed packet from the receiving transceiver. If there is a match, the controller issues an acknowledge bit to be transmitted to tell the receiver to process the data. Other suitable error correction may be a simple count of the 0 and 1 bits transmitted and received. If the sum matches, it is assumed the data transfer was accurate. Any error code may be generated by performing an algorithm on the transmitted and received data. If the error code matches, it is assumed the data transfer was accurate. For the examples described herein, it is assumed a simple echoing back of the data is the error correction technique used.

The controller 24 may be a simple state machine (e.g., firmware) or any other suitable circuit that controls a series of events, such as instructions to store, compare, control switch 22, adjust power of amplifier 18, etc., based on input signals. Another possible controller is a microprocessor. The power of the transmit amplifier 18 may be controlled by adjusting a bias current in the amplifier such as by switching in and out parallel current sources, or adjusted using a bias voltage, or adjusted using any suitable technique. Such techniques are well known. U.S. Pat. Nos. 4,760,347; 5,129,098; 5,446,756; and 6,148,220, all incorporated by reference, describe various techniques for adjusting transmitter power. The controller 24 may receive command signals from external pins or may be programmed by software or firmware to carry out sequences autonomously. One skilled in the art is intimately familiar with suitable controllers.

Figure 3:
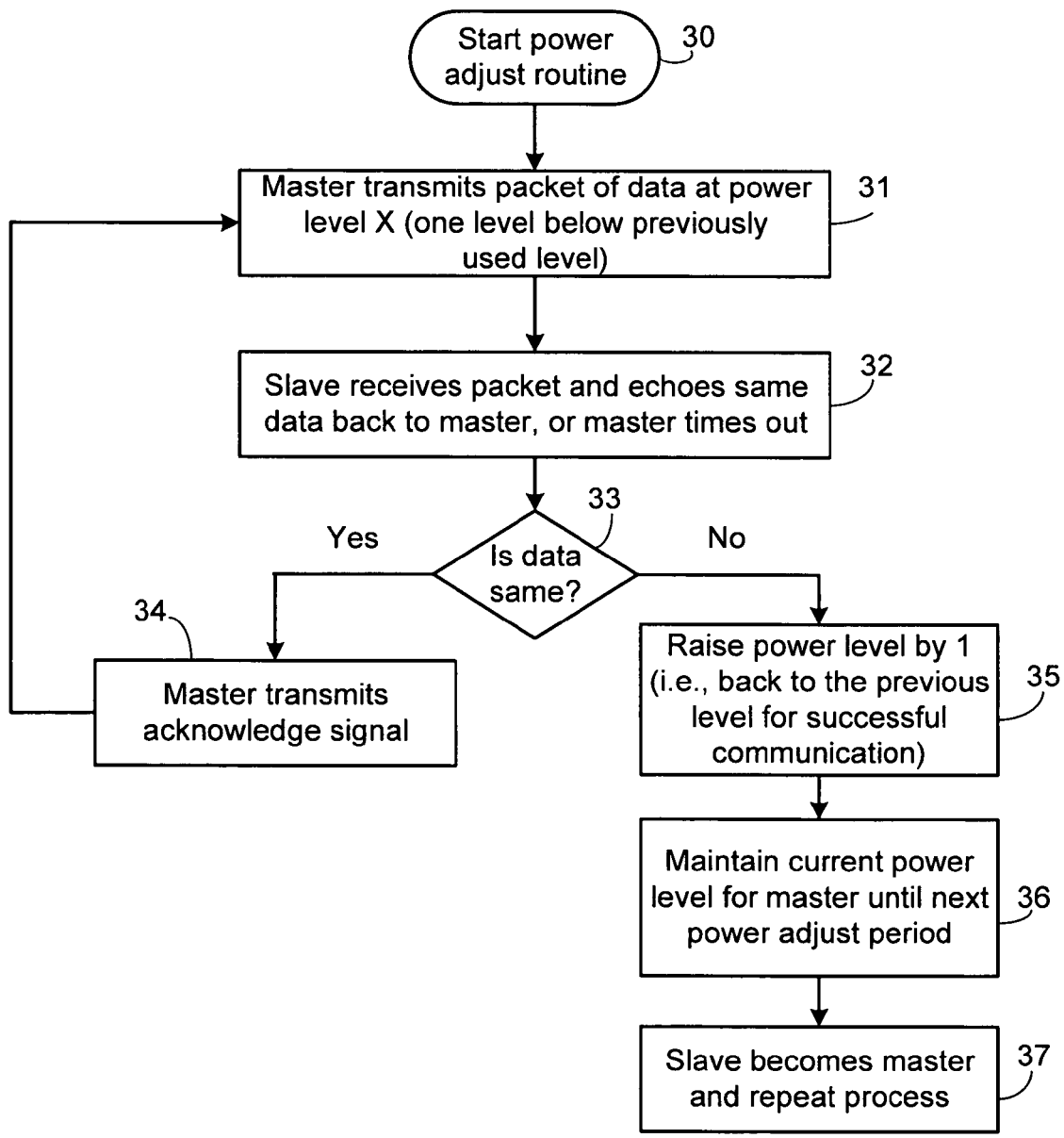
FIG. 3 is a flowchart of one routine for performing error correction and transmit power adjustment.
Figure 4:
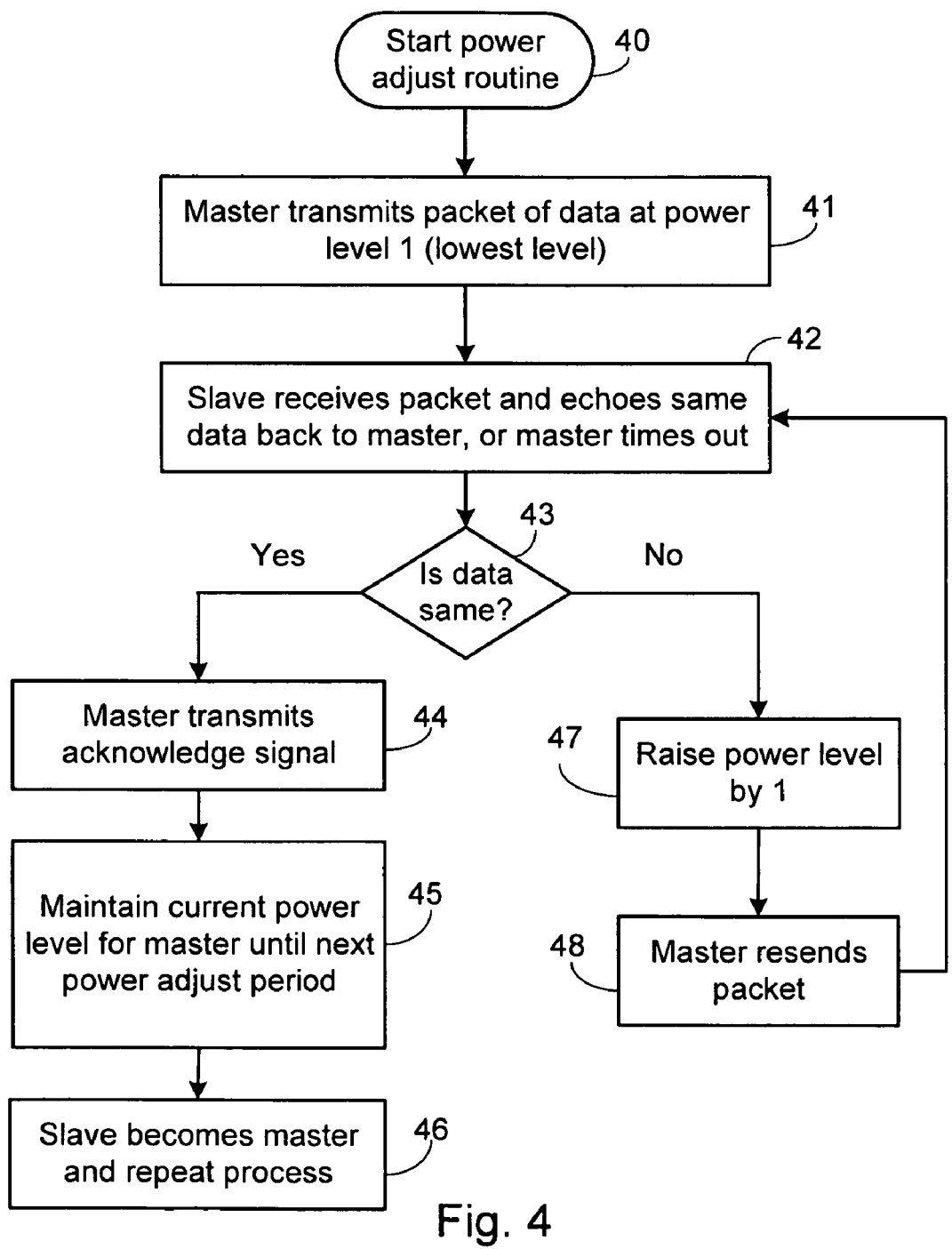
FIG. 4 is a flowchart of an alternate routine for performing error correction and transmit power adjustment.
Figure 5:
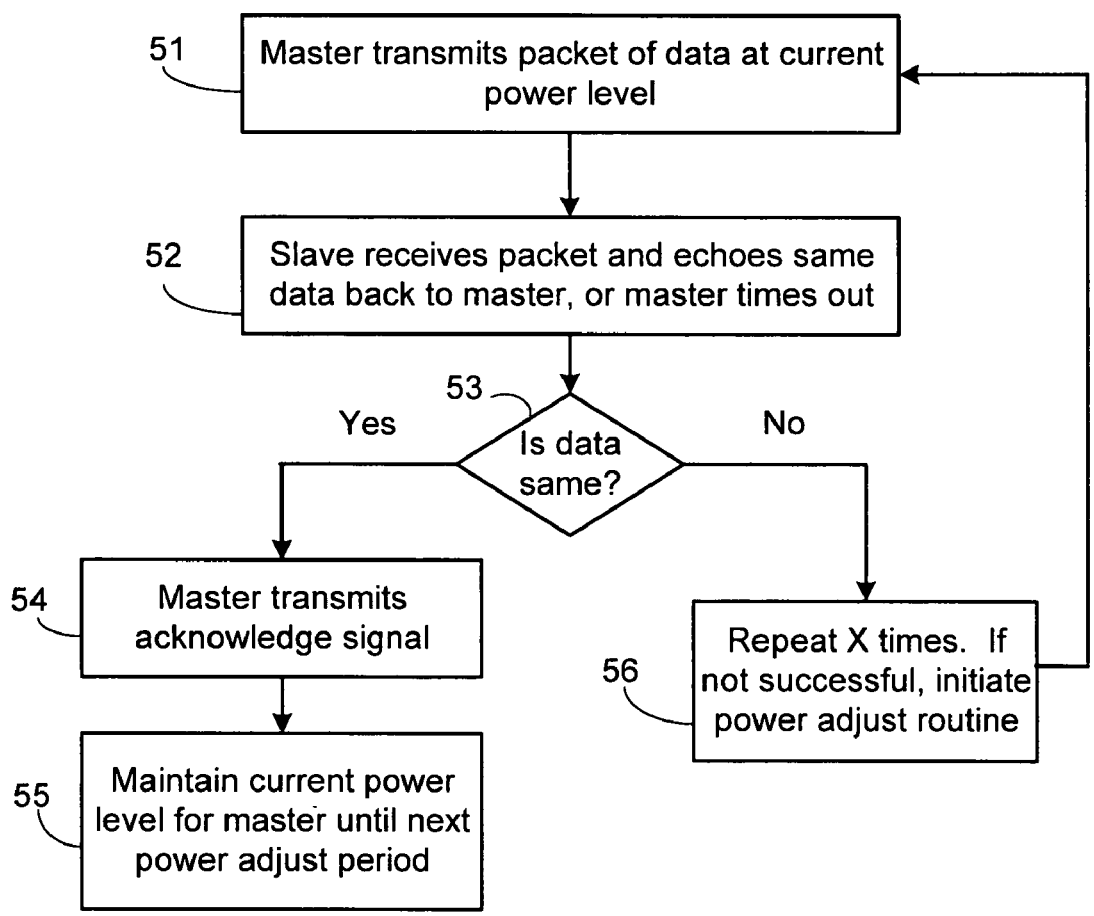
FIG. 5 is a flowchart showing how a power adjust sequence can be automatically initiated if errors are detected.

FIGS. 3-5 are flowcharts describing processes that may be carried out by the transceivers of FIGS. 1 and 2.

FIG. 3 is an example of one technique that optimizes transmit power with a minimum of overhead or no additional overhead. In step 30, the power adjust routine is started. The power adjust routine may occur for every packet, for every frame, for every X packets/frames, after certain time periods, after a transmission error has been detected, or at any other time. Prior to this time, it is assumed the master and slave have been communicating at a certain transmit power level pursuant to a previous power adjust routine. It is assumed there are seven power levels.

In step 31, the master reduces its power level by one and transmits a packet of data. In other embodiment, the reduction may be by more than one level or by a variable number of levels. The packet of data may be any data and can be unrelated to the power adjust routine. If there is no data to be sent, the master may periodically send a test data packet to perform a power adjust routine.

In step 32, the slave receives the packet and echoes the packet back to the master at the slave's previously set power level. The controller 24 contains a timer (e.g., a counter/clock) that will time out if an echo (or other error correction signal) is not received by the master within a predetermined time.

In step 33, it is determined if the data transfer was accurate. If so, the master transmits an acknowledge bit, step 34, to the slave to indicate that the data transfer was accurate. The slave then outputs the data to an output port. The process then goes back to step 31, where the master again reduces its transmit power by one level. Ultimately, the power level will be at its minimum level with accurate data transmission, or there will be a faulty echo, or the master will time out without receiving any echo signal from the slave.

If, in step 33, it is determined that the data was not accurately received, it is assumed that the fault was due to the lowered transmit power level being too low, since the previous power level had produced an accurate data transfer. In step 35, the master then raises the power level back up to the previous power level, and that power level is maintained as the optimal power level (step 36) until the next power adjust routine.

Accordingly, there is at most one missed packet due to the power adjust routine, resulting in a minimum of overhead for the routine.

At some time after the above routine is completed, the slave will become the master (step 37) and the process will repeat.

The master may send a power adjust initiation notice to the slave informing the slave that the master will perform a power adjust routine. In response, the slave would be blocked from performing its own power adjust routine. Optionally, the slave may temporarily transmit at full power to ensure there are no errors caused by insufficient transmit power by the slave during a power adjust routine.

FIG. 4 describes an alternative embodiment where the master initiates the power adjust routine by resetting its power level to the minimum level (level 1). Certain aspects of the routine of FIG. 3 are applicable to the routine of FIG. 4 and will not be repeated. In step 40, the power adjust routine is initiated.

In step 41, the master resets its power level to level 1 and transmits a data packet.

In step 42, the slave receives the packet and echoes the packet back to the master at the slave's previously set power level (or optionally at maximum power). The controller's 24 timer will time out if an echo (or other error correction signal) is not received by the master within a predetermined time.

In step 43, it is determined if the data transfer was accurate. If so, the master transmits an acknowledge bit, step 44, to the slave to indicate that the data transfer was accurate. The slave then outputs the data to an output port. In step 45, the master maintains the current optimal power level until the next power adjust routine.

At some time, the slave will then become the master (step 46) and the process will repeat.

If, in step 43, it is determined that the data was not accurately received, it is assumed that the fault was due to the transmit power being too low. In step 47, the master then raises the power level up one level.

In step 48, the master resends the same packet, and the process starting from step 42 is repeated until the power level is sufficient to accurately transfer data.

If the power adjust routine is only intermittently performed, there may be a time between the normal adjustment periods that the power is insufficient and the data transfer is not accurate. FIG. 5 is a flowchart that addresses that problem.

In step 51, the master transmits a packet to the slave at the current power level.

In step 52, the slave receives the packet and echoes the packet back to the master at the slave's previously set power level. The controller's 24 timer will time out if an echo (or other error correction signal) is not received by the master within a predetermined time.

In step 53, it is determined if the data transfer was accurate. If so, the master transmits an acknowledge bit, step 54, to the slave to indicate that the data transfer was accurate. The slave then outputs the data to an output port.

In step 55, the master maintains its current power level until the next adjustment period. Hence, in steps 51-55, no power adjustment is performed.

If, in step 53, it is determined that the data was not accurately received, step 56 is performed. In step 56, the master may repeat the transmission to ensure the faulty transfer was not due to intermittent noise. It is then assumed that the problem is due to the power being too low, and one of the previously described power adjustment routines is initiated. The power adjustment routine may begin at the current level and incrementally raise the power level until there is an accurate data transfer.

Figure 6:
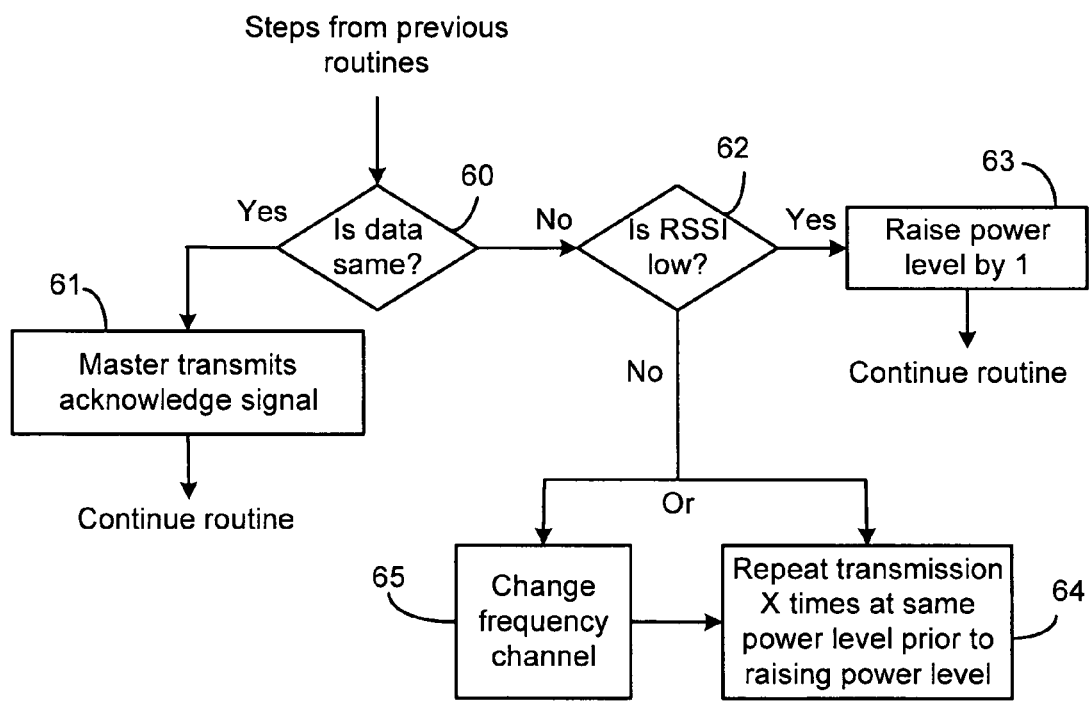
FIG. 6 is a flowchart of a power adjust routine that uses an RSSI level in conjunction with an acknowledge signal to determine if the power level should be raised.

The above techniques allow for an efficient power adjust routine even if an RSSI signal is not available. In some cases, an RSSI circuit is embedded in the system, and the RSSI signal may be used to detect if a bad transmission is due to low power or due to noise. The RSSI signal is transmitted by the receiver to the transmitter and identifies the total signal power received (including noise within the detected frequency range). FIG. 6 illustrates a technique that can be used in conjunction with the methods of FIG. 3 and FIG. 4 if an RSSI signal is available.

In step 60 of FIG. 6, it is determined whether the echoed data from the slave in FIGS. 3 and 4 is the same as the data transmitted by the master. If so, then in step 61, the master transmits an acknowledge signal as in FIGS. 3 and 4, and the routines of FIGS. 3 and 4 are continues.

If in step 60 it is determined that the echoed data is not the same, the RSSI level is sensed in step 62. If the RSSI level is low (i.e., below a threshold), indicating that there is no substantial interfering noise and that the transmitted signal level is too low, the process continues to step 63, where the master raises the power level. The process then continues as shown in FIGS. 3 and 4.

If in step 62 it is determined that the RSSI level is not low, indicating that there is substantial interfering noise, the process continues to either step 64 or step 65, depending on if the system can change frequency channels. Assuming the system does not have a scanning capability, then step 64 is carried out, whereby the master repeats the transmission X number of times (e.g., 1-5 times) at the same power level with the assumption being that the previous faulty communication was due to intermittent noise. The process then continues to step 42 in FIG. 3 or step 52 in FIG. 4.

If the system has a scanning capability, then step 65 is carried out, whereby the master changes the frequency channel and repeats the transmission at the same power level. The receiver (slave), in its normal operating mode, scans the various channels looking for a valid transmission by the master so will detect the master's transmission if the transmission is sufficiently powerful and there is not substantial noise. The process then continues to step 42 in FIG. 3 or step 52 in FIG. 4.

In one embodiment, instead of the slave performing its own power adjustment, the master transmits a code commanding the slave to adjust its power level to equal that of the master. For seven levels of power, the adjustment code may be just three bits.

The above techniques are just some examples of adjusting transmitter power levels using little or no overhead. The techniques can be applied to any type of transceiver. In the preferred embodiment, the transceiver of FIG. 2 (other than the antenna) is formed as an integrated circuit. A crystal oscillator and other components (e.g., capacitors) may be external to the transceiver chip.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A technique for adjusting a transmit power level in a master transceiver comprising:
   a. transmitting first data by a master transceiver;
   b. detecting a transmission from a slave transceiver indicating whether the first data was accurately received by the slave transceiver;
   c. if the master transceiver detects that the first data was accurately received by the slave transceiver, then transmitting an acknowledge signal by the master transceiver to the slave transceiver;
   d. automatically lowering a transmit power level of the master transceiver;
   e. after automatically lowering the transmit power level, transmitting second data by the master transceiver;
   f. detecting any transmission from the slave transceiver indicating whether the second data was accurately received by the slave transceiver;
   g. if the master transceiver detects that the second data was accurately received by the slave transceiver, then transmitting an acknowledge signal by the master transceiver to the slave transceiver;
   h. raising the transmit power level of the master transceiver in the event that the master transceiver does not detect that the second data was accurately received by the slave transceiver and retransmitting the second data; and i. repeating steps f-h until the master transceiver detects that the second data was accurately received by the slave transceiver.

2. The method of claim 1 wherein step d comprises lowering the transmit power level to a minimum level.

3. The method of claim 1 wherein the first transmit power level is adjustable in increments, and wherein step d comprises lowering the transmit power level by at least one power level.

4. The method of claim 1 wherein the first transmit power level is adjustable in increments, and wherein step d comprises lowering the transmit power level by one power level.

5. The method of claim 1 wherein the first transmit power level is adjustable in increments, and wherein step h comprises raising the transmit power level by at least one power level.

6. The method of claim 1 wherein the first transmit power level is adjustable in increments, and wherein step h comprises raising the transmit power level by one power level.

7. The method of claim 1 wherein step f comprises detecting an echo of the second data from the slave receiver.

8. The method of claim 1 wherein step f comprises detecting an error code from the slave receiver.

9. The method of claim 1 wherein step h comprises raising the transmit power level of the master transceiver in the event that the master transceiver does not detect that the second data was accurately received by the slave transceiver prior to a timer in the master transceiver timing out and then retransmitting the second data.

10. The method of claim 1 further comprising performing steps d-i only at certain intervals.

11. The method of claim 1 further comprising performing steps d-i if it is detected that the first data was not accurately received by the slave transceiver.

12. The method of claim 1 wherein steps a and e comprise transmitting data by frequency shift keying.

13. The method of claim 1 further comprising:
 detecting a receive signal strength indication (RSSI) signal;
 wherein step h comprises raising the transmit power level of the master transceiver in the event that the master transceiver does not detect that the second data was accurately received by the slave transceiver and that the RSSI signal was below a certain threshold, and then retransmitting the second data.

14. The method of claim 13 wherein step h further comprises:
 retransmitting the second data at the transmit power level used in step e if the RSSI signal level was above a certain threshold.

15. The method of claim 13 wherein step h further comprises:
 changing a transmit frequency channel if the RSSI signal level was above a certain threshold; and
 retransmitting the second data at the transmit power level used in step e.

16. A master transceiver formed as an integrated circuit comprising:
 a transmit power amplifier having a variable power output;
 a controller for performing various functions including varying the power output of the power amplifier;
 the controller being configured to perform the following functions:
 a. transmitting first data by the master transceiver;
 b. detecting any transmission from a slave transceiver indicating whether the first data was accurately received by the slave transceiver;
 c. if the master transceiver detects that the first data was accurately received by the slave transceiver, then transmitting an acknowledge signal by the master transceiver to the slave transceiver;
 d. automatically lowering a transmit power level of the master transceiver;
 e. after automatically lowering the transmit power level, transmitting second data by the master transceiver;
 f. detecting any transmission from the slave transceiver indicating whether the second data was accurately received by the slave transceiver;
 g. if the master transceiver detects that the second data was accurately received by the slave transceiver, then transmitting an acknowledge signal by the master transceiver to the slave transceiver;
 h. raising the transmit power level of the master transceiver in the event that the master transceiver does not detect that the second data was accurately received by the slave transceiver and retransmitting the second data; and
 i. repeating steps f-h until the master transceiver detects that the second data was accurately received by the slave transceiver.

17. The master transceiver of claim 16 wherein step d comprises lowering the transmit power level to a minimum level.

18. The master transceiver of claim 16 wherein the first transmit power level is adjustable in increments, and wherein step d comprises lowering the transmit power level by at least one power level.

19. The master transceiver of claim 16 wherein the first transmit power level is adjustable in increments, and wherein step d comprises lowering the transmit power level by one power level.

20. The master transceiver of claim 16 wherein the first transmit power level is adjustable in increments, and wherein step h comprises raising the transmit power level by at least one power level.

21. The master transceiver of claim 16 wherein the first transmit power level is adjustable in increments, and wherein step h comprises raising the transmit power level by one power level.

22. The master transceiver of claim 16 wherein step f comprises detecting one of an echo of the second data from the slave receiver or an error code from the slave receiver.

23. The master transceiver of claim 16 wherein step h comprises raising the transmit power level of the master transceiver in the event that the master transceiver does not detect that the second data was accurately received by the slave transceiver prior to a timer in the master transceiver timing out and, in response, retransmitting the second data.

24. The master transceiver of claim 16 further comprising:
 a detector for detecting a receive signal strength indication (RSSI) signal;
 wherein step h comprises raising the transmit power level of the master transceiver in the event that the master transceiver does not detect that the second data was accurately received by the master transceiver and that the RSSI signal was below a certain threshold, and then retransmitting the second data.

25. The master transceiver of claim 16 wherein step h further comprises:
 retransmitting the second data at the transmit power level used in step e if the RSSI signal level was above a certain threshold.

26. The master transceiver of claim 16 wherein step h further comprises:
  changing a transmit frequency channel if the RSSI signal level was above a certain threshold; and
  retransmitting the second data at the transmit power level used in step e.

* * * * *